United States Patent [19]

Bell et al.

[11] Patent Number: 4,477,715
[45] Date of Patent: Oct. 16, 1984

[54] PTC THERMISTOR CONTROLLED ELECTRIC DIESEL FUEL HEATER

[75] Inventors: Lon E. Bell; William P. Gruber, both of Altadena, Calif.

[73] Assignee: Technar Incorporated, Arcadia, Calif.

[21] Appl. No.: 399,337

[22] Filed: Jul. 19, 1982

[51] Int. Cl.³ ............... H05B 1/02; F02M 31/00; F23D 11/44; F24H 1/10
[52] U.S. Cl. ................................ 219/205; 123/549; 123/557; 210/184; 219/301; 219/307; 219/308; 219/328; 219/505; 431/208
[58] Field of Search ............... 219/296–299, 219/301–309, 328, 504, 505, 205–207; 123/549, 557; 431/207, 208; 210/184, 186

[56] References Cited

U.S. PATENT DOCUMENTS

| | | | |
|---|---|---|---|
| 3,235,084 | 2/1966 | King et al. ................. | 210/184 X |
| 3,375,774 | 4/1968 | Fujimura et al. .......... | 219/505 X |
| 3,400,252 | 9/1968 | Hayakawa et al. ........ | 219/504 |
| 3,476,293 | 11/1969 | Marcoux .................... | 219/301 X |
| 4,354,822 | 10/1982 | Madsen et al. ............ | 219/271 X |
| 4,372,279 | 2/1983 | Parks ......................... | 123/549 X |

FOREIGN PATENT DOCUMENTS

| | | | |
|---|---|---|---|
| 2132519 | 1/1973 | Fed. Rep. of Germany ...... | 431/208 |
| 2316054 | 10/1974 | Fed. Rep. of Germany ...... | 219/307 |

Primary Examiner—A. Bartis
Attorney, Agent, or Firm—Christie, Parker & Hale

[57] ABSTRACT

An electric heater for heating diesel fuel includes a housing having an inlet and an outlet. A flat disk-shaped PTC thermistor is centrally mounted in the housing and is arranged so that the inlet directs fuel against one side of the thermistor to divert the flow of fuel outwardly around the marginal edges of the thermistor. An electrical resistance heater unit surrounds the thermistor between the walls of the housing and the thermistor and is provided with spaces through which the outwardly diverted fuel passes. A divider wall in the housing spaced from the heater unit and thermistor directs the fuel passing through the heater unit across the opposite side of the thermistor to the housing outlet. The PTC thermistor and electric heater unit are connected electrically in series whereby the thermistor functions to control heating output of the fuel heater in accordance with ambient temperature conditions.

3 Claims, 15 Drawing Figures

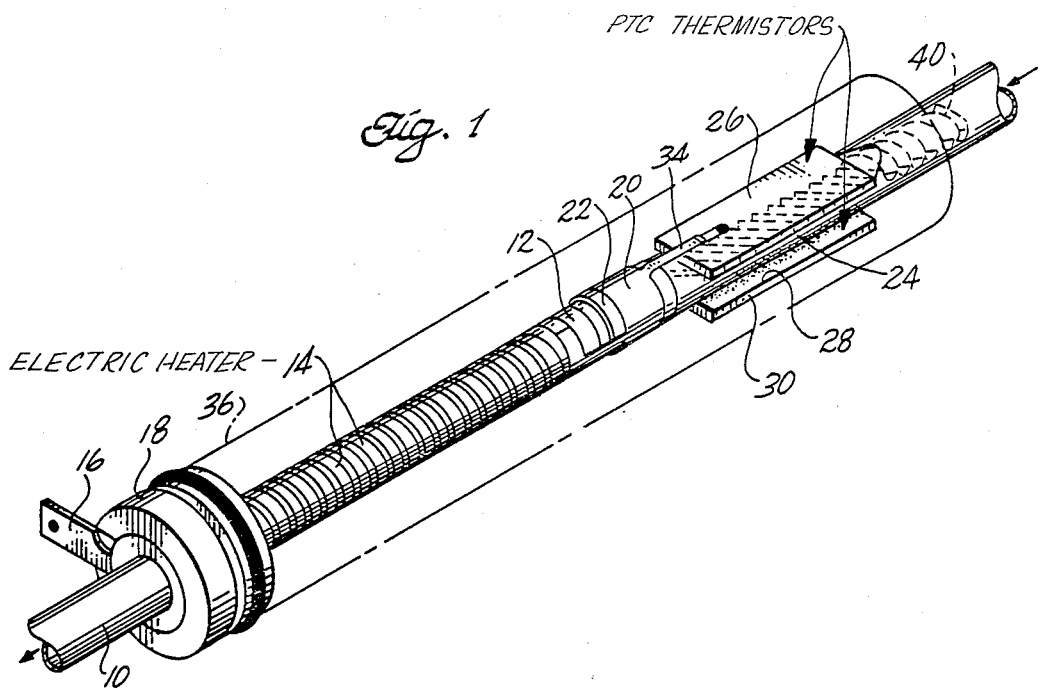
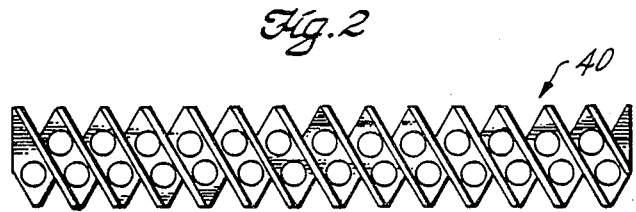
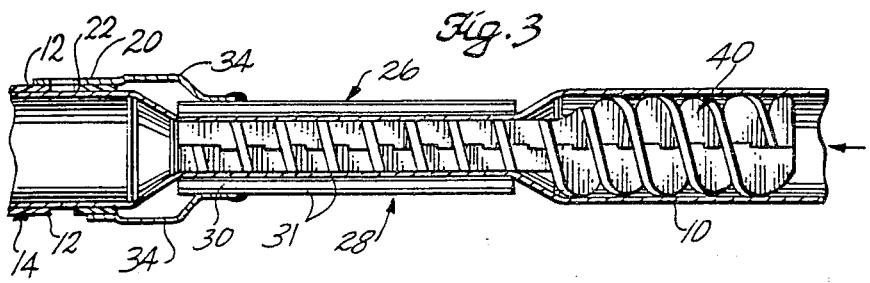

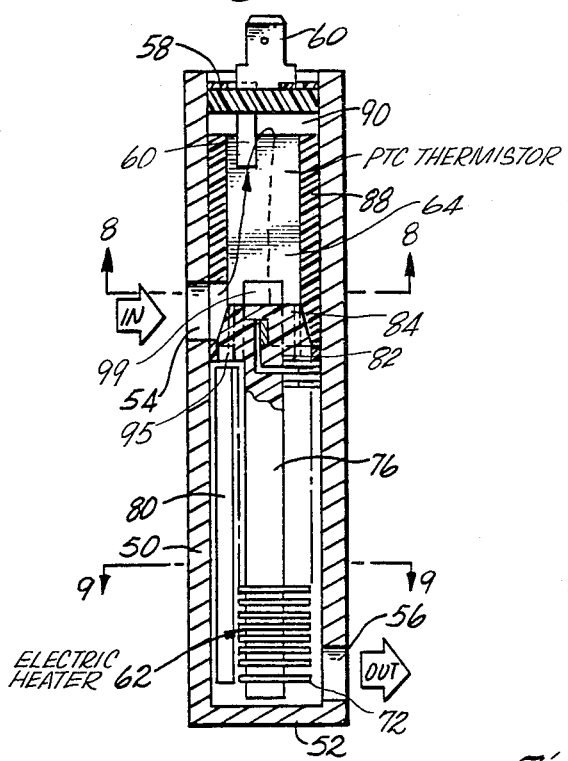
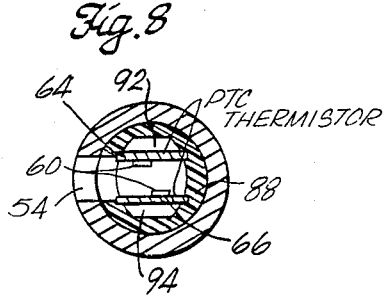
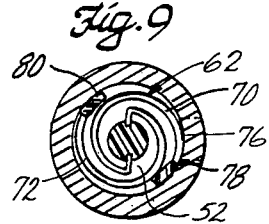
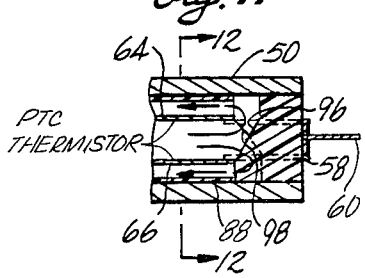
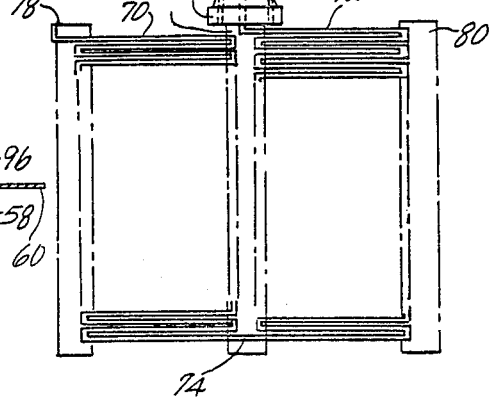
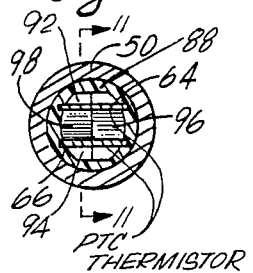

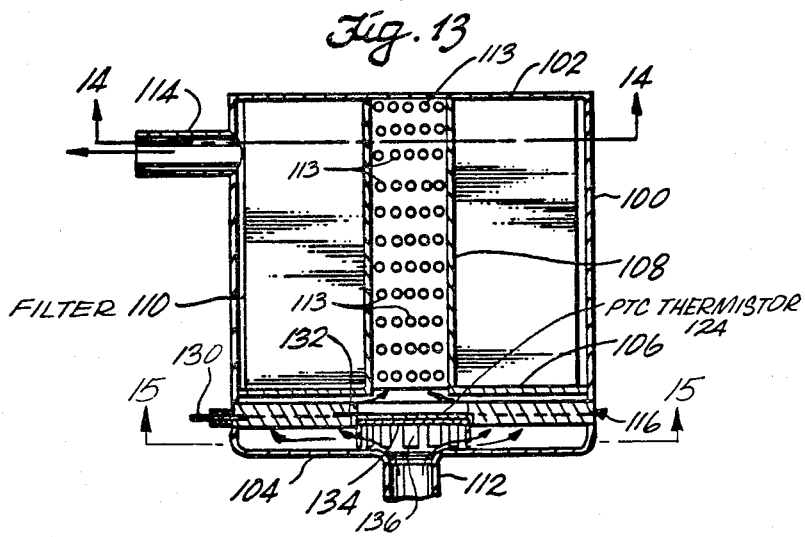
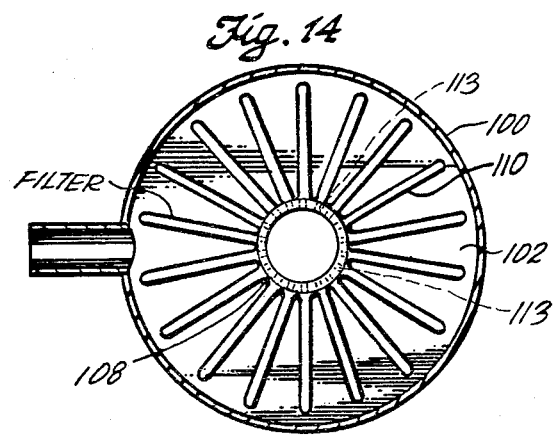
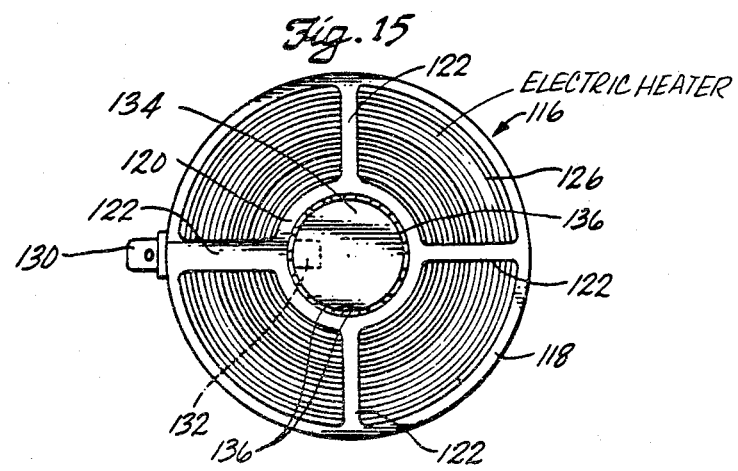

PTC THERMISTOR CONTROLLED ELECTRIC DIESEL FUEL HEATER

FIELD OF THE INVENTION

This invention relates to fuel heaters for diesel fuel and, more particularly, to a thermistor controlled fuel heater for diesel engines.

BACKGROUND OF THE INVENTION

Diesel fuel used in internal combustion engines must be filtered before going to the fuel injection pump. Such filters tend to become clogged with a waxy material in the fuel which precipitates out of the diesel fuel at lower temperatures. It is therefore generally necessary to provide heating of the diesel fuel before it enters the filter when the ambient temperature drops below about 10° C. Electric fuel heaters have been used in the past with a thermally sensitive mechanical switch being used to turn the heater on or off, depending on the temperature of the fuel. One such fuel heater arrangement is described, for example, in copending application Ser. No. 289,166 filed Aug. 3, 1981, in the name of the same inventor as the present application, now issued as U.S. Pat. No. 4,424,422. However, because thermally activated snap-acting mechanical switches are relatively expensive to manufacture, are not always reliable, and are expensive to replace, it is desirable to provide a fuel heater which does not depend on a mechanical switch for its operation.

SUMMARY OF THE INVENTION

The present invention is directed to an improved electrical fuel heater which utilizes a relatively inexpensive solid state switching element that is thermally sensitive for providing heat to the fuel when the temperature of the fuel drops below a predetermined level. This is accomplished, in brief, by providing a combination resistance type heater element connected in series with a thermistor element having a positive temperature coefficient of resistance. Both the heater element and the thermistor element are in thermal contact with the fuel line for heating the fuel as it flows in the line to the filter, the thermistor element being positioned upstream of the heater a sufficient distance that the temperature of the thermistor is normally not directly affected by the transfer of heat from the heater element to the fuel line.

Because of the positive temperature coefficient characteristic of the thermistor, it functions to limit the flow of current through the thermistor and resistance heater when the temperature of the thermistor rises above a level at which the thermistor element changes to a high resistance characteristic. By controlling the temperature rise of the thermistor from heat generated by the internal resistance, the effect of ambient temperature change on thermistor resistance can be modified to produce a sharply defined switching action.

This is accomplished, in brief, by utilizing a positive coefficient thermistor element mounted in a manner to provide good heat transfer between the thermistor element and fuel at a position upstream of an electrical heater unit. Circulation of the fuel past the thermistor element is modified to increase the coefficient of heat transfer between fuel and the thermistor.

DESCRIPTION OF THE DRAWINGS

For a more complete understanding of the invention, reference should be made to the accompanying drawings, wherein:

FIG. 1 is a perspective view of a fuel heater according to one embodiment of the present invention;

FIG. 2, is a top view of a mixer element;

FIG. 3, is a side view of the same mixer element inserted in a fuel line with the protective jacket removed;

FIG. 7 is a cross-sectional view of an alternative embodiment of the present invention;

FIG. 8 is a sectional view taken substantially on the line 8—8 of FIG. 7;

FIG. 9 is a sectional view taken substantially on the line 9—9 of FIG. 7;

FIG. 10 shows the construction of the heater element;

FIG. 11 is a partial side view in section of a modified design of the heater of FIG. 7;

FIG. 12 is a sectional view taken on the line 12—12 of FIG. 11;

FIG. 13 is a sectional view of another embodiment of the present invention;

FIG. 14 is a sectional view taken on the line 14—14 of FIG. 13; and

FIG. 15 is a sectional view taken on the line 15—15 of FIG. 13.

DETAILED DESCRIPTION

Figure 4:
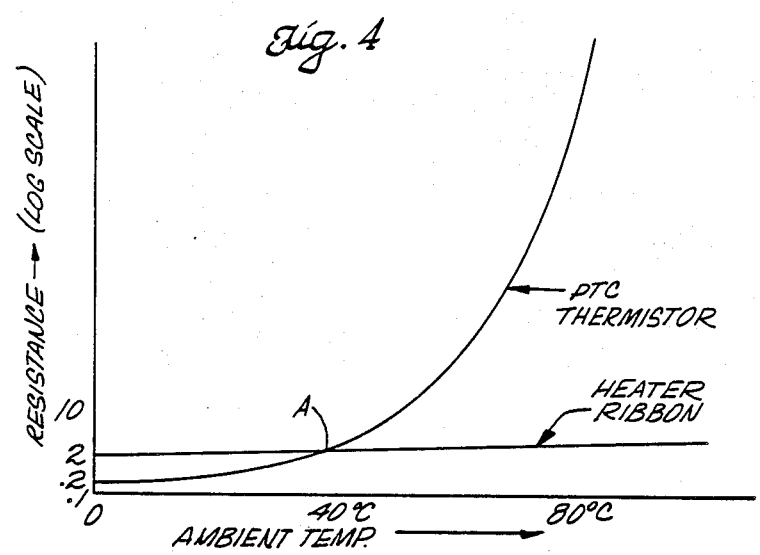
FIG. 4 is a plot of resistance as a function of temperature of the heater and thermistor elements.

Referring to the embodiment of FIGS. 1–3 in detail, the numeral 10 indicates generally a fuel line in the form of a thin-walled metal tube which directs diesel fuel or the like from a tank or other storage container to the fuel filter. A portion of the tube is wrapped or coated with a very thin layer of electrical insulating material 12, and then a ribbon of electrical resistance heater wire 14 is wound in a helix over the insulating layer. One end of the heater ribbon 14 is connected to an electrical terminal 16 supported on the outside of the tube by an insulating collar 18. The other end of the heater ribbon is connected to an electrical connector 20 supported on the tube 10 by means of an insulator sleeve 22.

The wall of the cylindrical metal tube 10 is flattened to provide a short section 24 of tube that is substantially rectangular in cross-section. This flattened or rectangular section 24 of the tube is positioned upstream of the heater ribbon 14. A pair of thermistor elements 26 and 28 are mounted on the opposing surfaces of the rectangular tube section by a suitable adhesive, as described hereafter. Each of the thermistor elements is in the form of a thin layer of thermal resistor material 30 having a positive temperature coefficient of resistance, a material commonly referred to as a PTC thermistor. The thermistor is a semiconductor ceramic material manufactured by sintering a mixture of material, the main ingredient of which is barium titanate. The temperature response of the PTC thermistor is determined by the composition of the material and has the characteristic that it has a fairly stable resistance at lower temperatures, but at some controllable higher temperature the resistance increases sharply to a very much higher level of resistance. Suitable thermistor materials can be purchased commercially from a number of sources. For example, suitable material for the fuel heater of the present invention is sold by T.D.K. Electronics Co., Ltd., under the designation P3-D.

The layer of thermistor material 30 is coated on each side with a metallic film forming electrodes on the thermistor elements. One electrode of each thermistor is in direct contact with the flat surface of the tube and the opposite surface is electrically connected to the connector 20 through a conductor 34. Thus the two thermistor elements are connected in parallel with each other and in series with the heater ribbon. The adhesive material bonding the thermistor elements to the tube is preferably made of an epoxy containing a high concentration of metallic or carbon particles to provide maximum thermal and electrical conductivity between the thermistor elements and the tube. The thermistor and heater assembly are preferably enclosed in a protective jacket 36.

Figure 5:
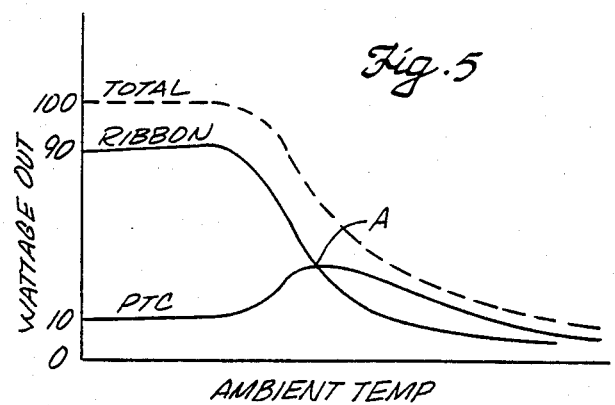
FIG. 5 is a plot of wattage output of the heater and thermistor element as a function of heater assuming perfect heat transfer between the thermistor and fuel.

Because the thermistor elements function as both a heat source and as a switching device, the rate at which heat is transferred from the thermistors to the fuel is critical to the proper operation of the device. At low ambient temperatures, the resistance of the two thermistor elements in parallel is less than the resistance of the heater ribbon. Since the total current through the two thermistor elements is the same as the current through the heater ribbon, the wattage of the resistance heater is larger than the wattage of the thermistor elements. If one assumes perfect heat transfer between the thermistor elements and the fuel, then there is substantially no temperature build-up in the thermistor elements when the ambient temperature of the fuel is low. This is shown by the plot of wattage versus ambient temperature as shown in FIG. 5. As the ambient temperature of the fuel rises, as shown in FIG. 4, the resistance of the thermistor elements increases. And a temperature is reached, as indicated at A in FIG. 4, where the resistance of the heater ribbon and the thermistor elements is the same. At this temperature, equal wattage is, of course, produced in the heater ribbon and in the thermistor element, as shown in FIG. 5. Since the total resistance has increased, the current and hence the total wattage has decreased. With a further increase in ambient temperature, the resistance of the thermistor element rises more steeply, reducing the level of current and causing the wattage in the thermistor element to decrease along with the total wattage. Under these conditions, the thermistor element does not make a very effective switching device since the total wattage changes rather slowly over a broad temperature range.

Figure 6:
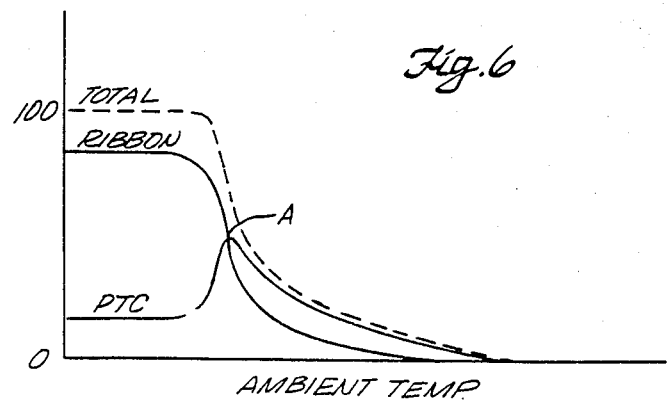
FIG. 6 is a similar plot of wattage as a function of temperature with a slightly reduced heat transfer coefficient.

If, on the other hand, the heat transfer from the thermistor elements to the fuel is not as good, the temperature of the thermistor elements, due to internal heating, will exceed the ambient temperature of the fuel and, as a result, the point at which the wattage is divided equally between the ribbon heater and the thermistor elements occurs at a lower ambient fuel temperature, that is, the internal heating of the thermistor causes the internal temperature of the thermistor to rise to the level at which the resistance of the thermistor is equal to the resistance of the ribbon heater at a substantially lower ambient temperature of the fuel. This results in a much sharper peaking of the wattage dissipated in the thermistor element and a much sharper drop-off of the total wattage, as illustrated in FIG. 6. As a result, the thermistor provides a much more effective switching action with change in ambient temperature of the fuel, and switching occurs at a lower ambient temperature for the fuel.

If the heat transfer rate is made too low so that the thermistor resistance is insensitive to the fuel temperature, the switching action becomes less sensitive to the ambient temperature condition of the fuel and switching becomes more erratic. The switching point in terms of ambient fuel temperature also tends to shift substantially with change in fuel flow rate.

One of the features of the present invention is that the heat transfer rate is controlled to produce a sharp switching action from internal heating of the thermistor elements while still providing a stable switching point in terms of ambient temperature of the fuel over a wide range of fuel flow rates. This was accomplished by designing the thermistor elements to have maximum surface contact with the fuel line tube and using an adhesive with high thermal conductivity to secure the thermistor elements to the tube. Another feature is the addition of a mixer element 40 in the fuel line tube positioned inside the region of the thermistor elements to enhance the mixing between the fuel that comes in contact with the warmed surfaces of the tube and the fuel that flows nearer the center of the tube. The mixer 40, when inserted in the tube, forms a pair of helical passages which direct the fuel in a swirling or helical pattern around the inner wall of the tube as the fuel advances past the region of the thermistor elements. As a result, the heat transfer rate between the thermistor elements and the fuel is enhanced and maintained at a level at which a sharp switching action occurs with small changes in ambient temperature of the fuel as it enters the heater. At the same time, a stable control over a wide range of fuel flow rates is provided by increasing fluid velocity. In other words, the fuel itself is used to control the heat transfer properties to produce the desired temperature versus wattage characteristic. In this way the heat transfer rate between thermistor elements and the fuel is controlled so that the internal temperature rise and hence the change in resistance of the thermistor element enhances the switching action, but the heat transfer rate is not so low as to produce instability and insensitivity to ambient temperature conditions of the fuel.

An alternative embodiment of the fuel heater of the present invention is shown in FIGS. 7-10. The fuel heater includes a tubular metal housing 50 having a closed end 52. An inlet opening 54 is used for admitting fuel into the heater in the mid-section of the tubular housing 50 while an outlet opening 56 directs fuel out of the heater at the closed end of the housing. A heater assembly is inserted into the housing from the open end. The top of the heater assembly includes a plug 58 at the open end of the housing, the plug supporting an electrical terminal 60 and being sealed to the housing when in place. The heater assembly also includes a resistance heater, indicated generally at 62, extending lengthwise of the housing from just below the input port 54 to the output port 56. The heater is directly immersed in the fuel. A pair of thermistor elements 64 and 66 are mounted in parallel relationship in the portion of the housing extending above the inlet port 54.

The heater assembly 62 is constructed as shown in FIG. 10 in two zig-zag sections 70 and 72 made of flat electrical resistance material. The two sections are connected in series at the lower end, as indicated at 74. The adjoining margins of the two sections 70 and 72 are molded into a central rod or post 76 while the outer edges are respectively molded into flat ribs 78 and 80, respectively. The heater sections are then bent into a helical configuration, as best shown in FIG. 9, which allows the heater assembly to be inserted into the housing 50 with the rod 76 in the center and the ribs 78 and 80 against the inner wall of the housing. The upper end of the rod 76 has a cap 82 which is the diameter of the inside of the housing 50 and functions to center the rod 76. The cap includes a tapered top 84 on which the thermistor elements 64 and 66 are supported. The thermistor elements are inserted in slots formed on the inside of a tubular sleeve 88 which fits down on top of the cap 82. The sleeve has an opening which is aligned with the housing inlet 54 and allows fuel to pass through the opening into the space between the two thermistor elements above the cap 82. The fuel then flows upwardly between the thermistor elements into an open space 90 above the top of the thermistor elements and back down the outside of the thermistor elements through the spaces 92 and 94. These spaces communicate with openings 95 extending through the cap 82, allowing the fuel to flow downwardly into the lower region of the housing past the heater 62 and through the outlet opening 56.

The thermistor elements are plated on each surface to form electrodes, one electrode surface of each of the thermistor elements being connected to the electrical terminal 60 and the other electrode surface of each thermistor being connected to the upper end 97 of the heater section 72 by a terminal 99. The upper end of the heater section 70 is in turn connected to the metal housing 50 to complete a current path from the terminal 60 to the grounded housing through the two thermistor elements in parallel and through the two heater sections 70 and 72 in series.

The embodiment of FIGS. 7-10 provides direct thermal contact between the fuel and both surfaces of the two thermistor elements, as well as direct contact with the resistance heater to provide optimum heat transfer to the fuel.

It will be understood that a mixing action to prevent layering of the heated and unheated oil in the vicinity of the thermistor surfaces can also be provided in the embodiment of FIGS. 7-10 by means of a mixing element such as shown in FIGS. 2 and 3. Such mixing elements can be inserted, for example, in the fluid flow paths adjacent the surfaces of the thermistor elements 64 and 66. An alternative mixing arrangement is shown in FIGS. 11 and 12 in which the plug 58 is modified to provide two adjacent inclined surfaces 96 and 98 which tend to divert the fluid coming up the surface of the thermistor element 66 toward the end of the passage adjacent the outside of the thermistor 64, while diverting fluid passing along the inside surface of the thermistor 64 to the outside of the passage extending outside the thermistor 66.

Yet another embodiment of the present invention is shown in FIGS. 13-15 in which the heater element is incorporated into the filter unit. The filter includes an outer cylindrical wall 100 closed off at one end by an upper wall 102 and closed off at the lower end by a bottom wall 104. A divider wall 106 separates the interior into two chambers. The upper chamber includes a central perforated tube 108 which opens at its lower end into the lower chamber of the filter housing. The annular space between the outer wall 100 and the tube 108 contains a folded filter element 110, such as a pleated paper filter.

Diesel fuel oil enters the filter through an inlet tube 112 in the bottom wall 104 and after flowing through the perforations 113 in the tube 108 passes radially through the filter element 110 to an outlet tube 114. A thermistor controlled heating element assembly, indicated generally at 116, is positioned in the lower chamber between the inlet tube 112 and the perforated tube 108. The heater assembly, as shown in FIG. 15, comprises a molded plastic frame 116 having an outer rim section 118, an inner rim section or hub 120 and four radial spokes 122 joining the rim 118 to the hub 120. A positive temperature coefficient thermistor element 124 in the form of a disc is mounted inside the hub 120. A resistance wire heating element 126 is positioned in the annular space between the outer rim 118 and the hub 120, the heater element being embedded in and supported by the spokes 122. One end of the heater element is connected to an outer terminal 130 while the other end of the heater element is connected to the thermistor element 124 by a terminal 132. A heat sink and electrical terminal 134 is attached to the opposite side of the thermistor 124 and is positioned directly in the intake flow path of the filter opposite the inlet tube 112. The heat sink and terminal 134 is grounded in any suitable manner to the wall of the filter housing while the terminal 130 is brought out through the side wall of the housing for connection to a battery or other power source.

In operation the cold fuel enters the inlet to the filter and into thermal contact with the thermistor element through the heat sink 134, cools the thermistor, thus reducing the resistance of the thermistor element and increasing the current flowing through the resistance heater. After impinging on the surface of the heat sink, the fuel is directed out between fingers 136 projecting from the heat sink. The rate of heat transfer from the thermistor element to the fuel is designed to provide the effect described above in connection with the curve shown in FIGS. 4-6.

In both embodiments, the fuel is essential to the operation of the heater switching operation. The fuel forms an imperfect heat sink which controls the temperature change in the thermistors to produce an abrupt switching action from full heater power to a much reduced heater power. This insures that there is no undue current drain at higher ambient temperature conditions but there is maximum power when the ambient temperature falls below a critical level.

What is claimed is:

1. A fuel heater for diesel fuel comprising electrical resistance heater means, thermistor means having a positive temperature coefficient of resistance, means for directing an electric current through the heater means and thermistor means in series, means directing fuel successively past the thermistor means and the heater means, the heater means and thermistor means being in heat exchanging proximity to the fuel, the heater means including a heater element having openings through which the fuel passes, and the thermistor means comprising a flat thin disk mounted at the center of the heater element.

2. Apparatus of claim 1 wherein said means directing fuel includes means directing the fuel at the disk along a path directed at the disk to the disk, the fuel being diverted by the disk toward the surrounding heater element.

3. A fuel heater for diesel fuel comprising a housing, a disk-shaped thermistor unit mounted in the housing, inlet means directing the fuel into the housing against one side of the thermistor unit to divert the flow outwardly and around the margin of the thermistor unit, heater means surrounding the thermistor unit, having spaces through which the fuel passes, means in the housing directing the fuel from the heater means across the opposite side of the thermistor unit and to an outlet.

* * * * *